US008328339B2

(12) United States Patent
Grasselli

(10) Patent No.: US 8,328,339 B2
(45) Date of Patent: Dec. 11, 2012

(54) METHOD AND APPARATUS FOR DIGITALLY PRINTING ON TEXTILE ARTICLES

(75) Inventor: Enrico Grasselli, Albese Con Cassano Como (IT)

(73) Assignee: J-Teck3 S.R.L., Albese Con Cassano, Como (IT)

( * ) Notice: Subject to any disclaimer, the term of this patent is extended or adjusted under 35 U.S.C. 154(b) by 1104 days.

(21) Appl. No.: 11/879,825

(22) Filed: Jul. 19, 2007

(65) Prior Publication Data

US 2008/0016630 A1 Jan. 24, 2008

(30) Foreign Application Priority Data

Jul. 20, 2006 (IT) .............................. MI2006A1420

(51) Int. Cl.
*G01D 11/00* (2006.01)

(52) U.S. Cl. ......................................... 347/100; 347/96

(58) Field of Classification Search .................. 347/100, 347/96, 95, 101; 106/31.6, 31.27, 31.13; 523/160, 161
See application file for complete search history.

(56) References Cited

U.S. PATENT DOCUMENTS

| | | | | | |
|---|---|---|---|---|---|
| 5,352,243 | A | * | 10/1994 | Ashizawa et al. | 8/401 |
| 5,368,611 | A | * | 11/1994 | Owenby et al. | 8/444 |
| 5,594,485 | A | * | 1/1997 | Koike et al. | 347/101 |
| 5,644,350 | A | * | 7/1997 | Ando et al. | 347/101 |
| 5,764,263 | A | * | 6/1998 | Lin | 347/101 |
| 6,022,383 | A | * | 2/2000 | Kuwabara et al. | 347/105 |
| 6,123,411 | A | * | 9/2000 | Inui et al. | 347/100 |
| 6,371,610 | B1 | * | 4/2002 | Nakamura et al. | 347/100 |
| 6,547,380 | B2 | * | 4/2003 | Smith et al. | 347/100 |
| 6,759,354 | B1 | * | 7/2004 | Smith et al. | 442/118 |
| 2002/0097290 | A1 | * | 7/2002 | Koitabashi et al. | 347/16 |
| 2006/0087540 | A1 | * | 4/2006 | Morimoto | 347/95 |
| 2006/0107855 | A1 | * | 5/2006 | Hatayama | 101/228 |

FOREIGN PATENT DOCUMENTS

JP 61179781 A * 8/1986

* cited by examiner

*Primary Examiner* — Manish S Shah
(74) *Attorney, Agent, or Firm* — Hedman & Costigan, P.C.; James V. Costigan

(57) ABSTRACT

A method for digitally printing on textile articles comprises a digital application of a dedicated diluent substance, according to the type of used coloring material (digital ink), thereby evenly distributing the volume and concentration of the dyeing substances, independently from the intensity of a desired color. An apparatus for carrying out the method uses a portion of a printing module, i.e. a printing head, not involved by the printing of the basic colors C-M-Y-K-, for injecting a specific diluent substance selectively integrating the printing, in which the color or dye, because of its low intensity, would be less than the amount necessary for achieving a passing of the coloring substances up to the opposite side of the fabric material to be printed upon.

4 Claims, 8 Drawing Sheets

METHOD AND APPARATUS FOR DIGITALLY PRINTING ON TEXTILE ARTICLES

BACKGROUND OF THE INVENTION

The present invention relates to a method and apparatus for digitally printing on textile or fabric articles.

As is known, a great drawback of the printing methods for digitally printing on fabric materials, is an impossibility of achieving an even penetration, i.e. a two-face vision, as colored areas which are colored with a different chromatic saturation must be imprinted.

In particular, it is practically impossible to obtain a satisfactory two-face vision on fabric materials, if light color areas must be made thereon.

Such a limitation is strictly bound to the digital printing concept, since, in order to provide a clear or light color shading (a low amount of color) it is necessary to deposit a set amount of ink (corresponding to the desired tone pattern) which, for clear or light tone patterns is much less than that necessary for dark tone patterns (a full tone pattern).

To a limited amount of ink, actually, also corresponds a limited impregnation of the receiving fabric material, and, accordingly, a poor penetration, in a case in which one desires to provide a bi-face printing effect, such as flags, curtains, foulards and so on.

Such a limitation has not been up to now solved and technically overcome.

The above mentioned drawback, in particular, limits and negatively affects the use of the digital printing technology, mainly in those areas where, on the contrary, it could express great advantages from an application flexibility standpoint.

Such a limitation, actually, cannot be detected in conventional printing methods, such as screen printing, and roto-printing methods, since the amount of ink deposited for surface unit is herein constant and, anyhow, can be controlled by parameters different from those expressed in the digital printing technology.

FIG. 1 schematically shows an example of a printing method for printing on a fabric material, by a conventional procedure, in particular a screen printing procedure.

As shown in this figure, the printing paste amount is specifically identical both in a clear or light color embodiment and in a dark fabric embodiment.

This characteristic allows to deposit a like color volume and, accordingly, to achieve a desired depth through the fabric material, thereby providing an acceptable bi-face vision, which feature is indispensable for printing upon articles such as flags, curtains and foulards and so on.

FIG. 2 shows a printing example in which a conventional digital printing method is used.

As clearly shown in FIG. 2, in such a digital application, the concentration of dye in the ink is a fixed one, and only the volume amount thereof can be changed.

Accordingly, for providing clear or light color areas, it is necessary to apply small amounts of inks, whereas, for dark colors, it would be possible to use comparatively high ink amounts.

This would constructionally hinder the penetration capability of clear colors with respect to dark colors, and an acceptable two-face vision would not be achieved.

In fact, only the dark colors or dyes are able to penetrate to a desired or target depth, whereas the clear dyes would be necessarily arranged only on the top surface of the support or fabric material.

Several searches have been carried out for solving the above mentioned problem, by using a lot of different approaches, for example by impregnating the fabric material before printing thereon, by using substances designed for improving the penetration of the ink material through the fabric.

However, since this would be an application generalized on the overall fabric, it is not possible to operate in a selective manner, and accordingly, as efficiently as desired.

SUMMARY OF THE INVENTION

Accordingly, the aim of the present invention is to provide a method and apparatus adapted to overcome the above mentioned equalizing problems in digital printing processes for printing upon textile or fabric articles.

Within the scope of the above mentioned aim, a main object of the invention is to provide such a method and apparatus which can use already commercially available machines, by slightly modifying the latter.

Yet another object of the invention is to provide such a method and apparatus which can be easily used by the end user.

According to one aspect of the present invention, the above mentioned aim and objects, as well as yet other objects, which will become more apparent hereinafter, are achieved by a method for digitally printing on textile articles, characterized in that said printing method provides to apply a dedicated diluent substance, specifically chosen depending on the type of the digital dye or ink, so used as to evenly distribute the volume and concentration of the dye materials, independently from the target color intensity.

BRIEF DESCRIPTION OF THE DRAWINGS

Further characteristics and advantages of the present invention will become more apparent hereinafter from the following disclosure of a preferred, though not exclusive, embodiment of the invention which is illustrated, by way of an indicative, but not limitative, example in the accompanying drawings, where.

DESCRIPTION OF THE PREFERRED EMBODIMENTS

Figure 1:
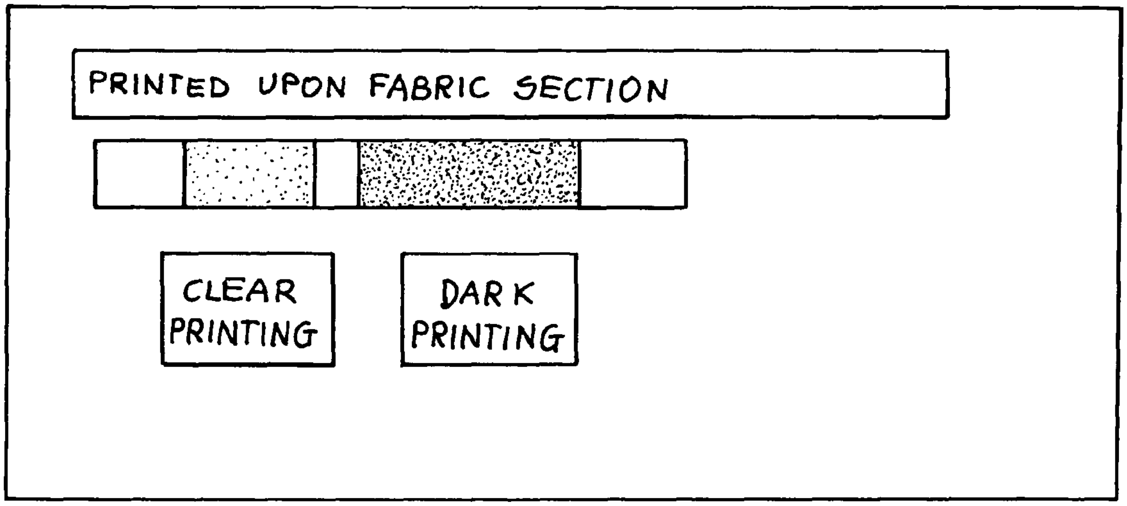
FIG. 1 is a schematic view showing an exemplary printing system for printing upon a fabric or textile material, by a conventional type of printing method, in particular a screen printing process.
Figure 2:
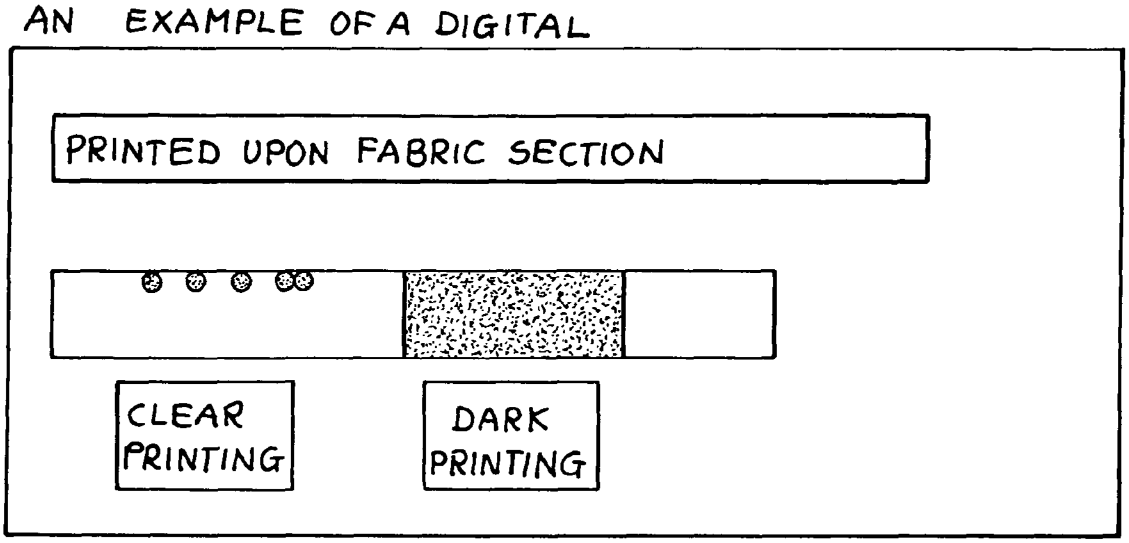
FIG. 2 is a further schematic view showing an example of a printing system using a conventional digital printing technique.
Figure 3:
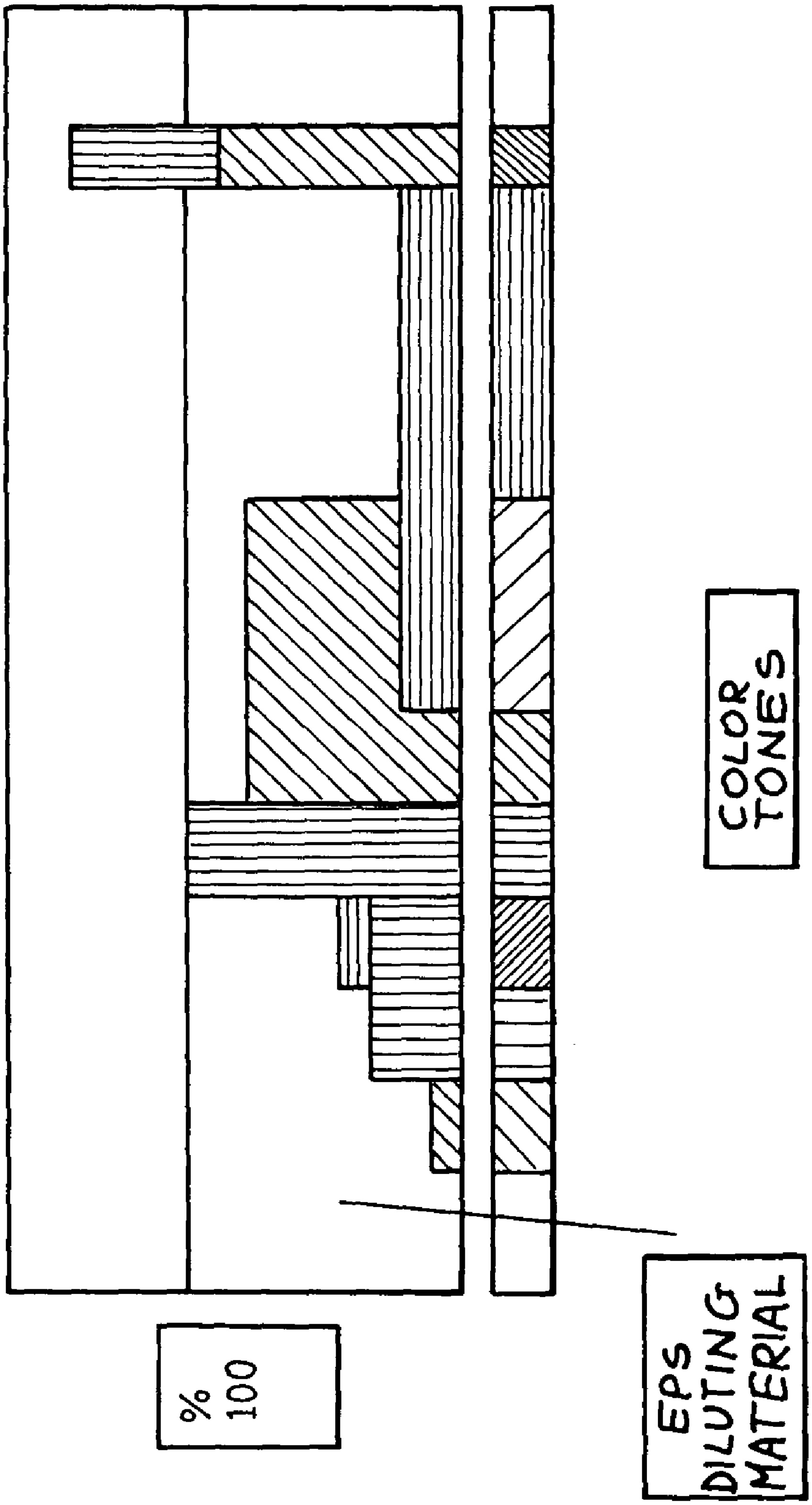
FIG. 3 is a further schematic view showing an exemplary embodiment of a printing system according to the present invention.
Figure 4:
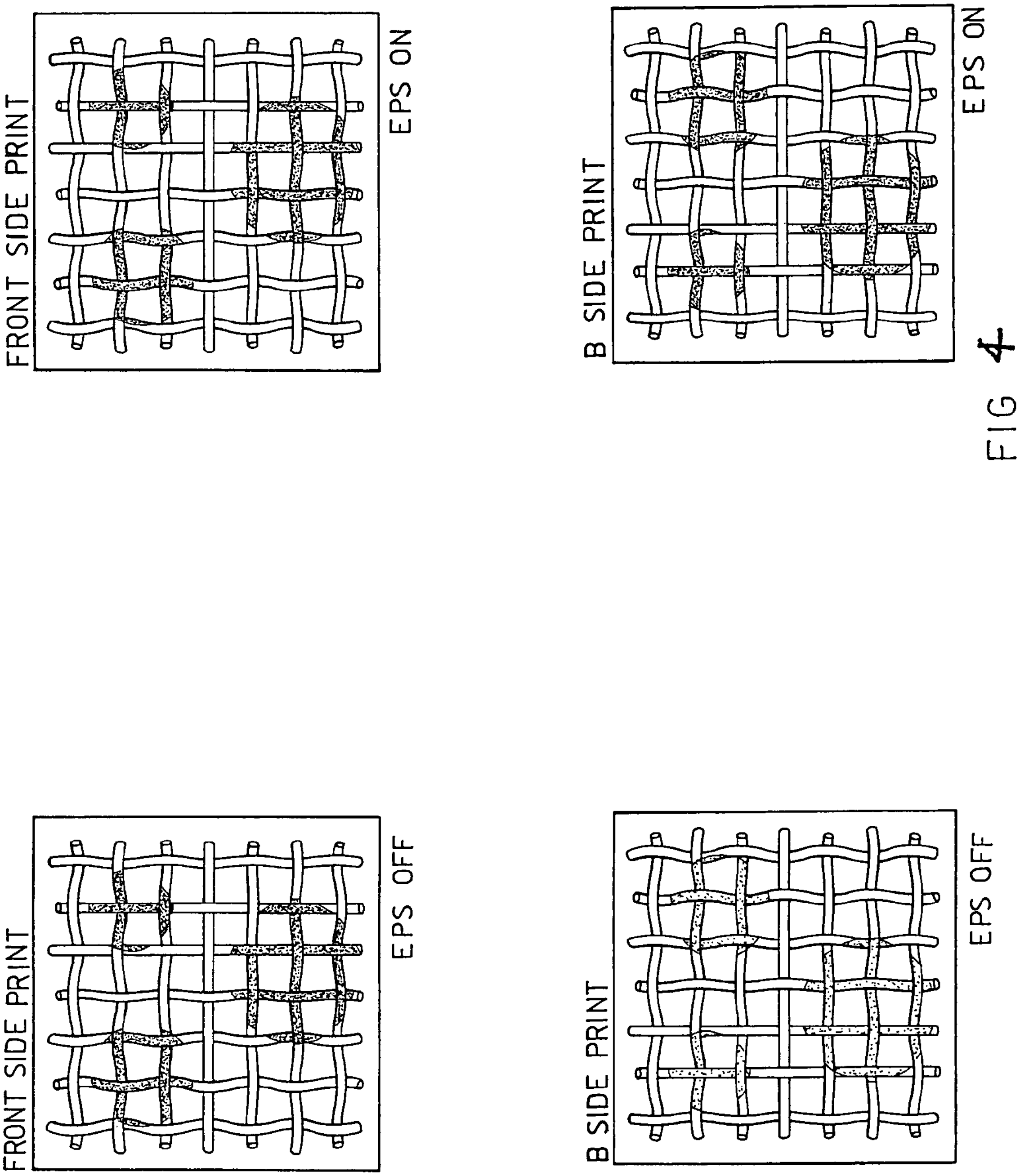
FIG. 4 is yet another schematic view showing the front and rear portions of a fabric material printed upon either with (EPS ON) or without (EPS OFF) the system according to the present invention.
Figure 5:
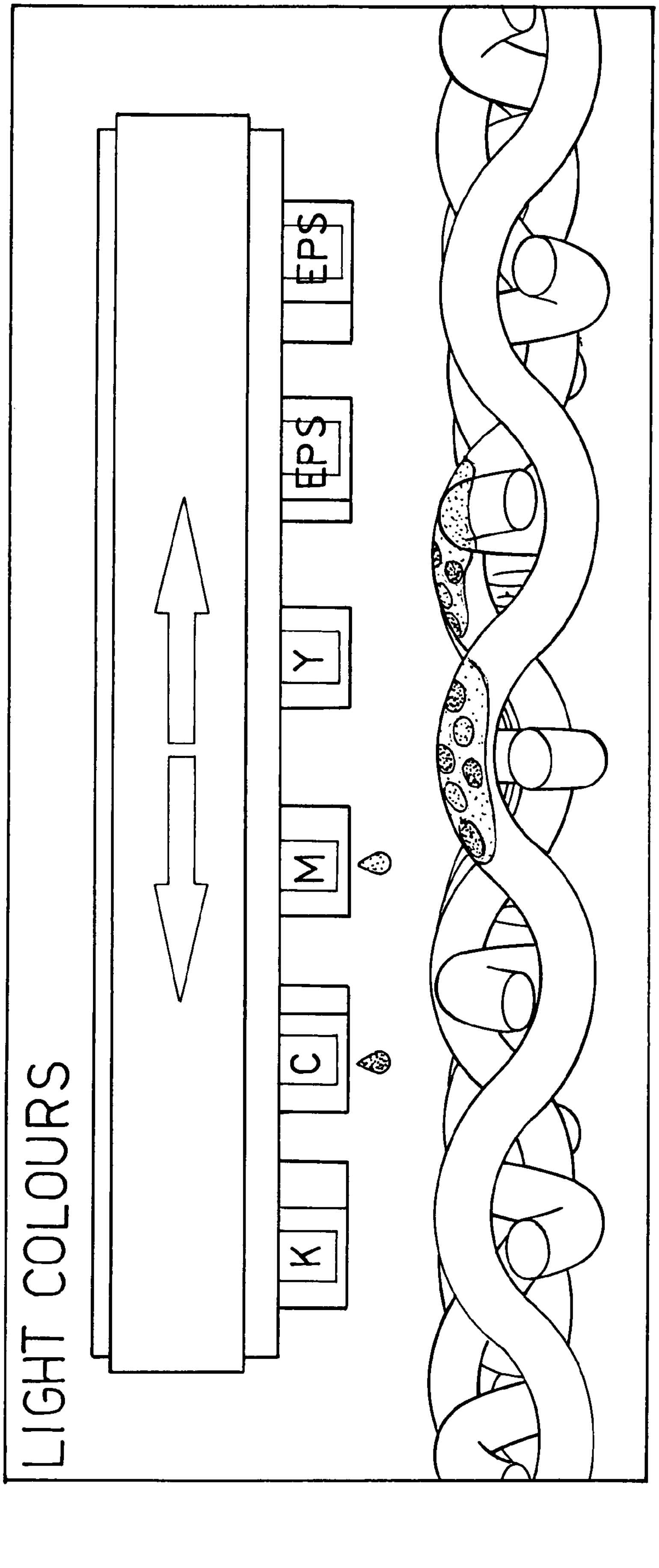
FIG. 5 is a further elevation schematic view showing a printing head, according to the present invention, and a fabric material printed upon in clear or light colors, and without using the subject printing system.
Figure 6:
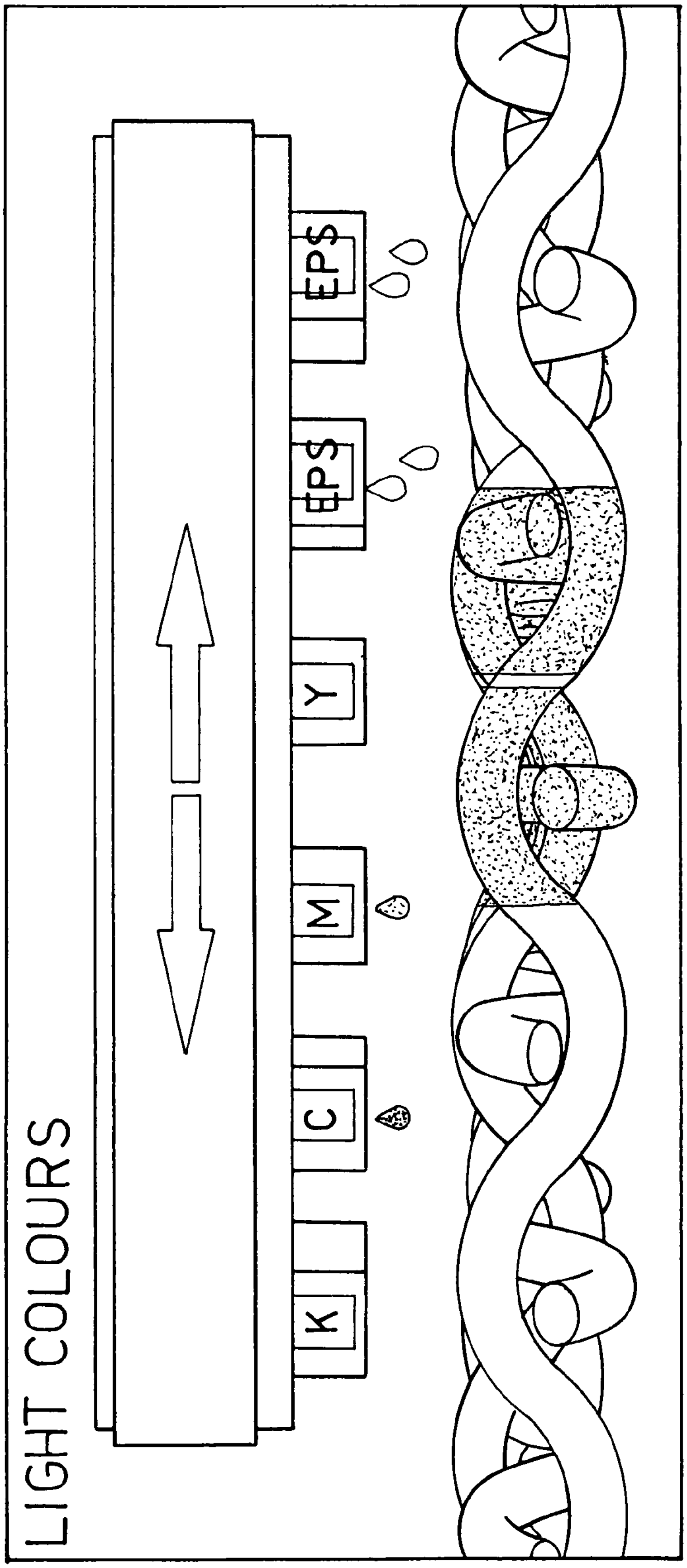
FIG. 6 is a view similar to FIG. 5, showing the printing head according to the present invention and the fabric material printed upon in clear or light colors, by using the system according to the invention.
Figure 7:
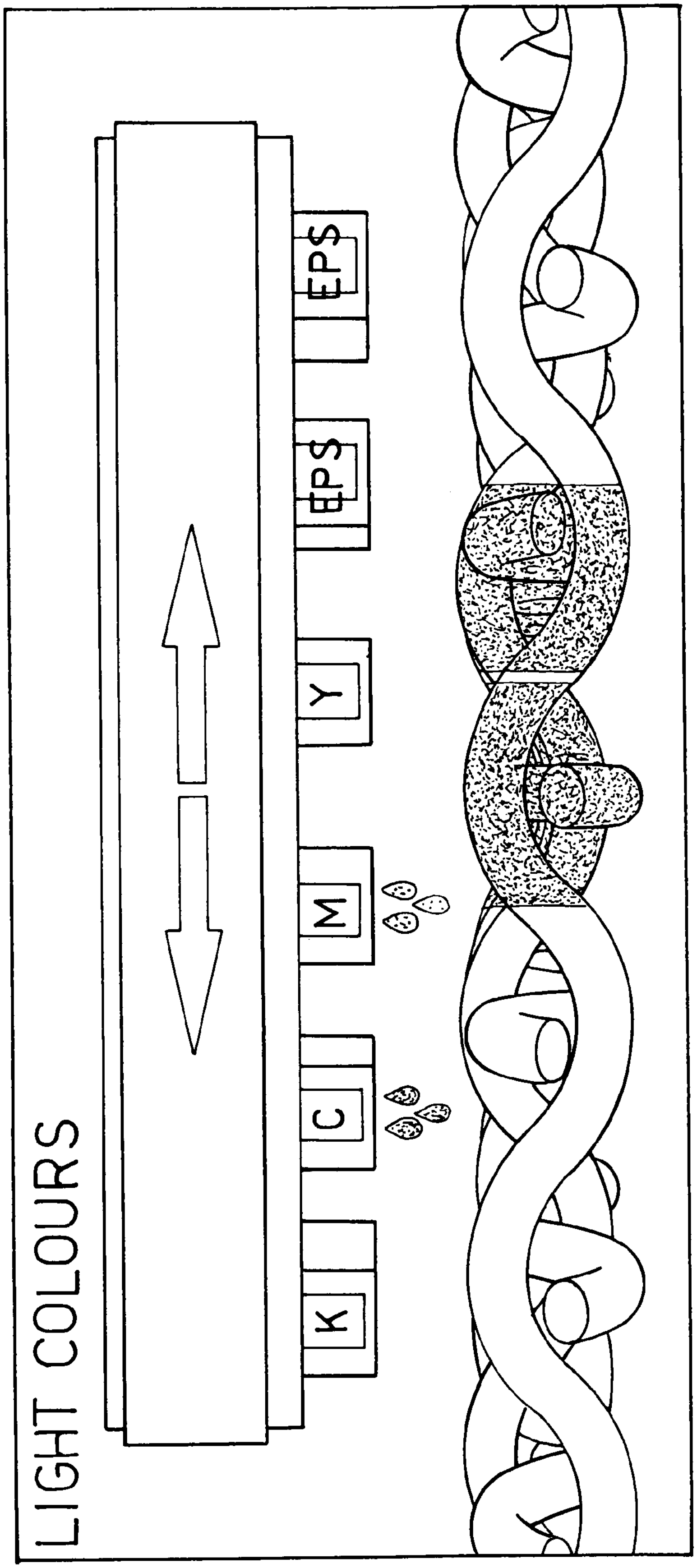
FIG. 7 is a view similar to FIG. 6, showing the printing head according to the present invention and the fabric material printed upon in dark colors, without using the subject system.
Figure 8:
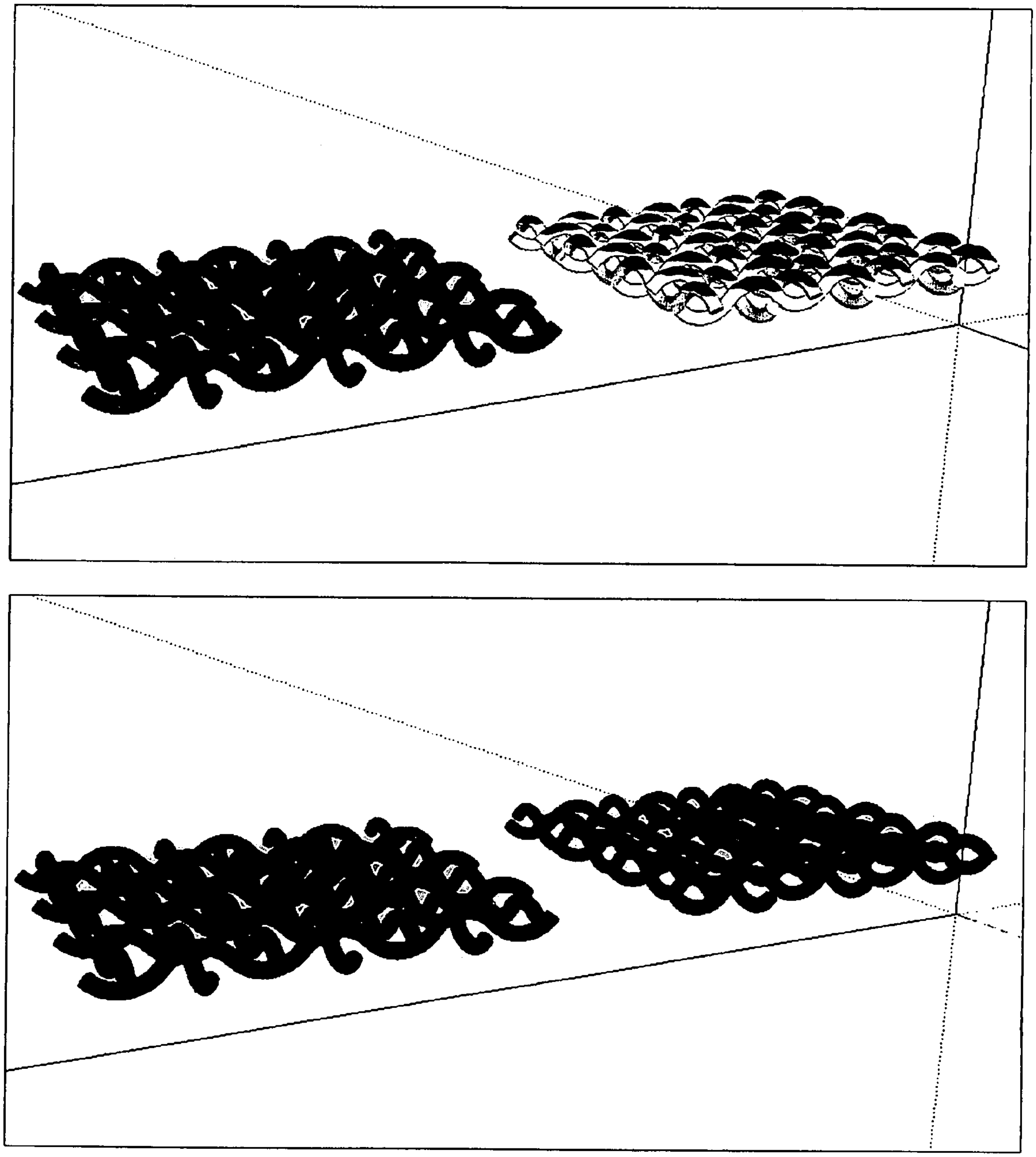
FIG. 8 is a view similar to FIG. 7, showing the printing head according to the present invention and the fabric material printed upon in dark colors by using the inventive system.
Figure 9:
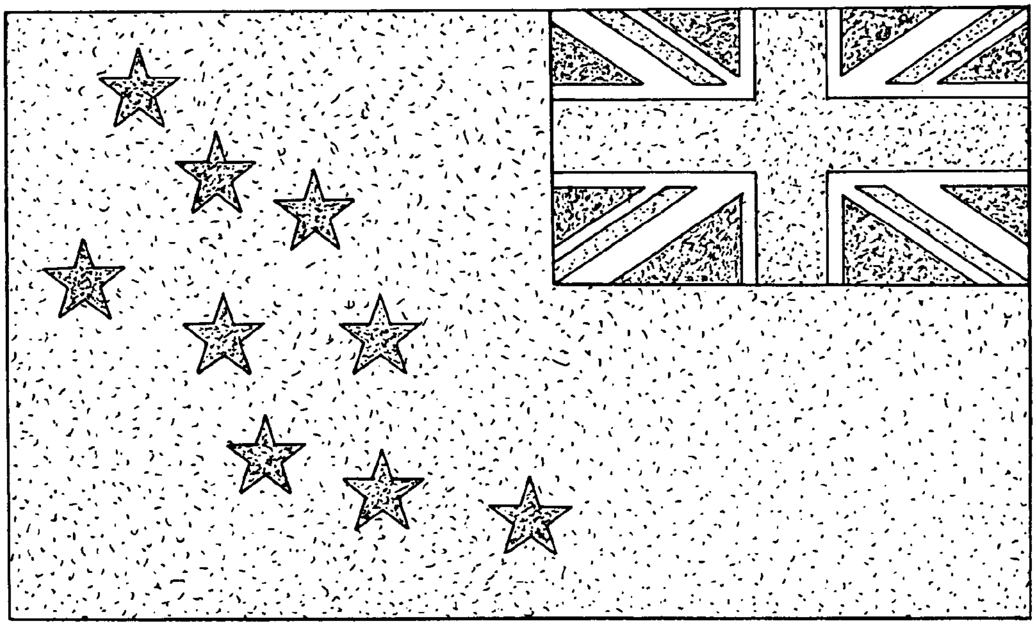
FIG. 9 is a perspective view showing a portion of a printed upon fabric material, which has been printed upon both in clear colors and in dark colors, respectively with and without the printing system according to the present invention.
Figure 9:
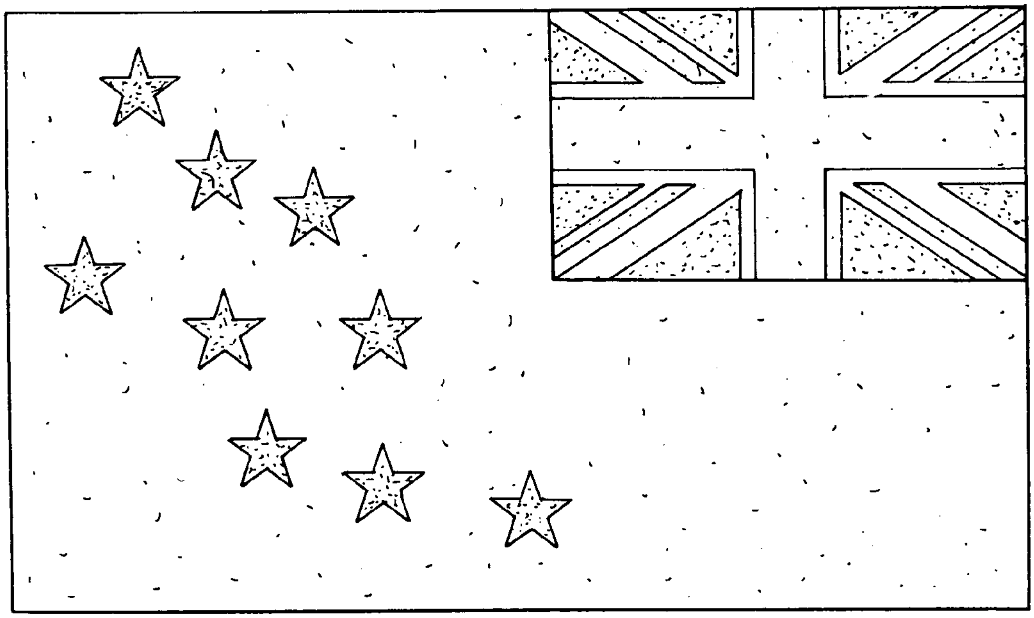

The digital printing method according to the present invention is a specifically designed technique for digitally applying a dedicated diluting substance or material, depending on the dye type (digital ink), herein used, thereby evenly distributing the volume and concentration of dye or dyeing substances, independently from the target dye intensity.

More specifically, the application is performed simultaneously to the printing of the dyes proper, and is so managed or controlled that all the areas involved in the printing are characterized by a like related volume.

In operation, it is possible to use a portion of a printing module, i.e. a printing head, not affected by the printing of the basic colors C-M-Y-K, to inject a specifically designed diluting material or substance, suitable to selectively integrate the printing the color of which, owing to its low or light intensity, would be less than the amount necessary to achieve the passage of the dye or coloring material to the opposite side of the fabric material to be printed upon.

Thus, the printing system according to the present invention provides that a portion of the printing head, which is conventionally used for printing half-tones or additional colors to the basic quadrichromi, is on the contrary used to inject the solvent.

With reference to the number references of the figures, the subject apparatus, according to an embodiment of the invention, and generally indicated by the reference number 1, can be made starting from a prior printing system, for example the Roland's printing system, available as model 740 FJ.

Such a printing system comprises a set of piezo heads, allowing to perform the target printing by using six different colors (Cyan, Magenta, Yellow, Black, Light Cyan, Light Magenta or Orange and Green).

As is known, Light Cyan and Light Magenta are conventionally used to improve the printing evenness, mainly at the image areas characterized by very light tones.

It should be apparent, and this is known in the prior art, that of the six heads included in the above disclosed plotter model, the first four heads (C-M-Y-K) are indispensable to achieve quadrichromatic printing images, whereas the other heads, indicated by the reference letters EPS, in the figures, must be considered as complementary head, which are not strictly indispensable for performing a quadrichromatic printing.

In particular, by using the two latter heads EPS, to apply the diluent material, it is possible to modulate, by a suitable software, the amount of diluent necessary to penetrate the fabric material to a like depth, and independently from the printed color tone intensity.

A further very important feature of the subject system is that it is not necessary to use half-tones, since the over-diluting provided by the diluting material improves the diffusion capability of the small dye drops, thereby preventing "dittering" areas from being formed, i.e. the visual perception of small intense color points at areas characterized by a clear dominating pattern, thereby it is not necessary to use light chromatic tones or dyes.

Hereinbelow are listed some composition examples to be used according to the present invention.

SOLVENT COMPOSITION EXAMPLE

| | |
|---|---|
| water | 93-30% |
| dispersing material | 2-20% |
| co-solvent material | 5-50% |
| wetting material | 0.1-5% |
| anti-bacteric material | 0.1-1% |
| pH buffer | 1% |

EXAMPLE OF AN EPS DILUTING FORMULATION FOR INK-JET PIGMENTS

| | |
|---|---|
| water | 93-30% |
| dispersing material | 2-20% |
| co-solvent material | 5-50% |
| wetting material | 0.1-5% |
| anti-bacteric material | 0.1-1% |
| acrylic binding material | 2-10% |
| pH buffer | 1% |

EXAMPLE OF AN EPS DILUTING FORMULATION FOR REACTIVE COLORING OR DYE MATERIALS

| | |
|---|---|
| water | 93-30% |
| dispersing material | 2-20% |
| co-solvent material | 5-50% |
| wetting material | 0.1-5% |
| Na bicarbonate | 2-5% |
| anti-bacteric material | 0.1-1% |
| pH buffer | 1% |

EXAMPLE OF AN EPS DILUTING FORMULATION FOR INK-JET REACTIVE DYE OR COLORING MATERIALS

| | |
|---|---|
| water | 93-30% |
| dispersing material | 2-20% |
| co-solvent material | 5-50% |
| wetting material | 0.1-5% |
| ammonium tartrate | 1-3% |
| anti-bacteric material | 0.1-1% |
| pH buffer | 1% |

It has been found that the invention fully achieves the intended aim and objects.

In fact the invention provides a digital printing method for digitally printing on a face of a textile support such as a flag, a curtain or a foulard, for achieving an even penetration of coloring materials through said textile support thereby providing on an opposite face of said textile support a two-face vision of colored areas printed on said a face of said textile support, said colored areas being colored with a different chromatic saturation, said digital printing method comprising the steps of providing a textile support to be printed upon, printing coloring materials on only said face of said textile support and simultaneously applying a diluting material to said coloring materials, said diluting material distributing said coloring materials with a coloring material even concentration and volume independently from the color intensity of said coloring materials, said printing and applying steps being digitally controlled to distribute through all the printing areas a like coloring material volume.

The invention claimed is:

1. A digital printing method for digitally printing on a face of a textile support such as a flag, a curtain or a foulard, for achieving an even penetration of coloring materials through said textile support thereby providing on an opposite face of said textile support a two-face vision of colored areas printed on said a face of said textile support, said colored areas being colored with a different chromatic saturation, said digital printing method comprising the steps of providing a textile support to be printed upon, printing coloring materials on only said face of said textile support and simultaneously applying a diluting material to said coloring materials, said diluting material distributing said coloring materials with a coloring material even concentration and volume independently from the color intensity of said coloring materials, said printing and applying steps being digitally controlled to distribute through all the printing areas a like coloring material volume.

2. A digital printing method, according to claim 1, wherein said diluting material applying step is carried out by a portion of a printing head not used for printing the basic colors C-M-Y-K.

3. A digital printing method, according to claim 1, wherein said diluting material applying step is carried out by a portion of a conventional printing head adapted to provide half-tones or additional colors in a basic quadrichromatic printing.

4. A digital printing method, according to claim 1, wherein said diluting material applying step comprises the sub-step of software modulating the diluting material amounts necessary to penetrate into the textile material support in a like amount and independently from the intensity of the printed color tones.

* * * * *